J. LAMPLE.
AUTOMOBILE BRAKE.
APPLICATION FILED MAR. 23, 1914.
1,176,573.
Patented Mar. 21, 1916.
2 SHEETS—SHEET 1.
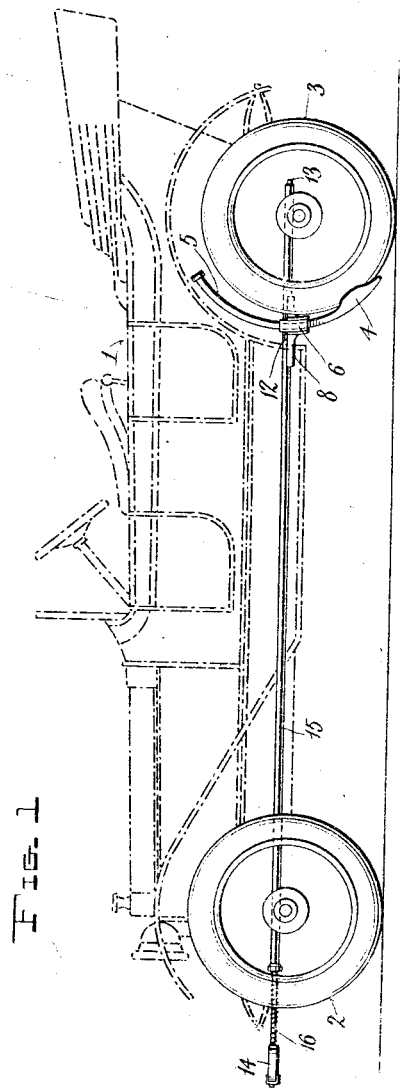
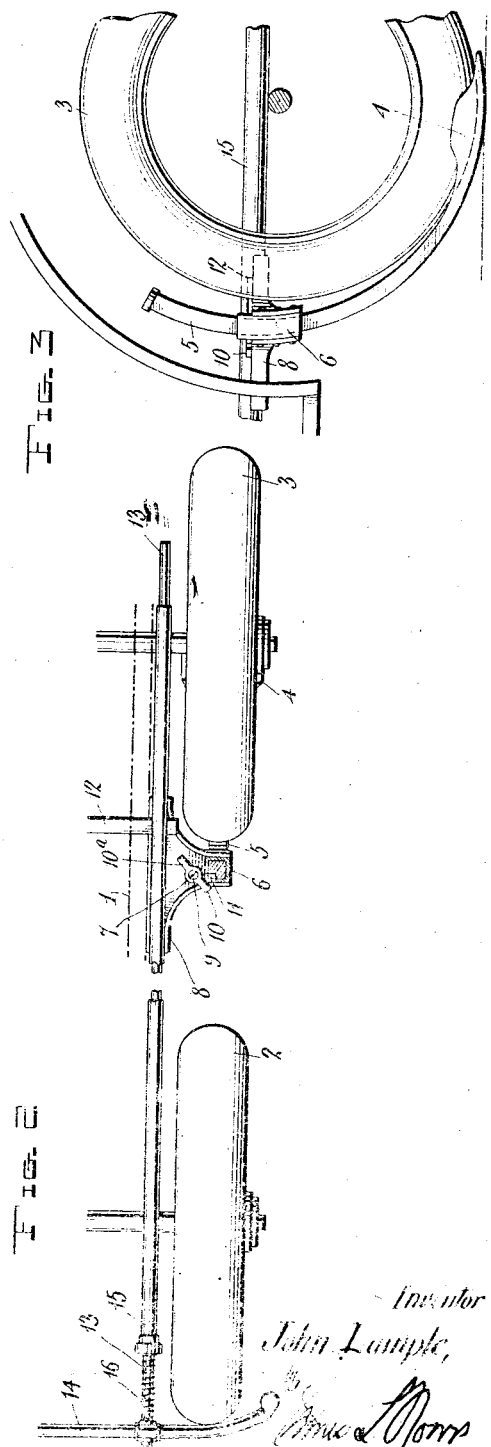
Witnesses
Inventor
John Lample,
Attorney J. LAMPLE.
AUTOMOBILE BRAKE.
APPLICATION FILED MAR. 23, 1914.
1,176,573.
Patented Mar. 21, 1916.
2 SHEETS—SHEET 2.
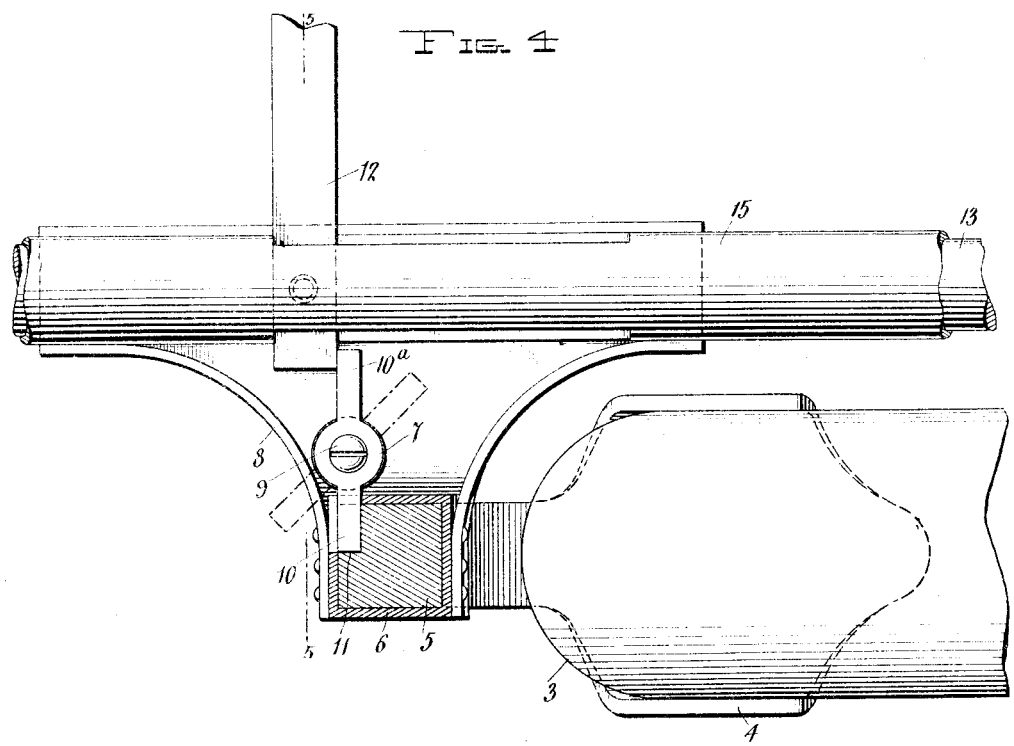
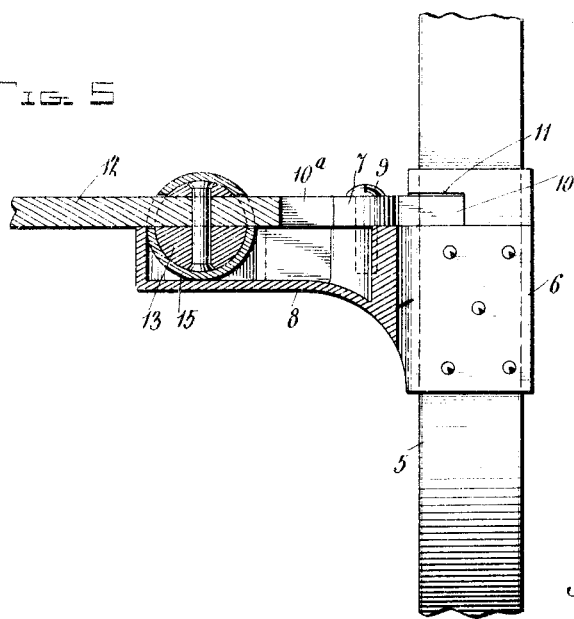
Witnesses
Inventor
John Lample,
by
Attorney

UNITED STATES PATENT OFFICE.

JOHN LAMPLE, OF NEW YORK, N. Y.

AUTOMOBILE-BRAKE.

1,176,573.  Specification of Letters Patent.  Patented Mar. 21, 1916.

Application filed March 23, 1914. Serial No. 826,625.

*To all whom it may concern:*

Be it known that I, JOHN LAMPLE, a citizen of the United States, residing at New York, in the county of New York and State of New York, have invented new and useful Improvements in Automobile-Brakes, of which the following is a specification.

The present invention relates to improvements in vehicle brakes and more especially to brakes for use upon automobiles, and the primary object of the invention is to provide a brake which will act automatically and instantly to arrest the movement of the automobile when the same encounters an object such, for example, as the body of a person, thereby bringing the automobile at once to a stop and avoiding passage of the automobile over such body.

The invention consists, generally speaking, of brake shoes adapted to move into positions between the wheels, preferably the rear driving wheels, and the ground, such brake shoes being normally held in an inoperative position by triggers and releasable automatically by rearward pressure upon a fender or other device at the front of the automobile.

To these and other ends, the invention consists in certain improvements, and combinations and arrangements of parts, all as will be hereinafter more fully described, the novel features being pointed out particularly in the claims at the end of the specification.

In the accompanying drawings: Figure 1 is a side elevation of an automobile equipped with brakes constructed in accordance with the present invention; Fig. 2 is a top plan view of a portion of the automobile showing one of the brakes in operative position; Fig. 3 is a side elevation of one of the wheels of the automobile showing the corresponding brake in operative position; Fig. 4 is a top plan view, partly in section, showing the trigger for controlling the action of the brake; Fig. 5 represents a transverse section on the line 5—5 of Fig. 4.

Similar parts are designated by the same reference characters in the several views.

Brakes embodying the present invention are applicable generally to automobiles and similar vehicles of various types.

The preferred construction of the invention is shown in the accompanying drawings and will be hereinafter described in detail.

It will be understood, however, that the invention is not restricted to the precise construction shown as equivalent constructions are included within the scope of the claims at the end of the specification.

In the present instance 1 designates the body of an automobile having the front and rear wheels 2 and 3 respectively. The brake acts preferably on the rear or driving wheels as such an arrangement enables the brake to arrest forward movement of the automobile even though the motor continues to drive the rear wheels. In the construction shown, a brake shoe 4 is provided for each rear wheel, this brake shoe being preferably concave so as to conform approximately to the shape of the tire on the wheel, and each brake shoe is attached to a bar 5 which bar is preferably curved and passes slidably through a guide 6. Normally, the brake shoes will occupy positions above the ground and in front of the wheels as shown in Fig. 1, and when the brake shoes are brought into action they will move into a position beneath the respective wheels and will engage the ground or the surface of the road. When in this position the brake shoes will have a frictional contact with the ground or road which will quickly arrest the forward movement of the automobile, and as the rear wheels rest upon the brake shoes and are out of contact with the ground or surface of the road, such wheels cannot propel the automobile forward even though the motor may continue to apply power to these wheels. Each brake shoe is normally held elevated or in its inoperative position by means which is releasable, preferably by rearward pressure upon a fender or other device located in front of the automobile. In the present instance a trigger 7 is provided for each brake shoe, the same being pivoted on the bracket 8 which supports the guide 6 at the point 9, and the trigger has a portion 10 adapted to engage in a notch or recess 11 formed in the bar 5 to which the brake shoe is attached, the trigger thereby holding the brake shoe in its elevated or inoperative position. The opposite end of the trigger has a portion $10^a$ which serves to trip the trigger, the trigger when tripped moving into the position indicated by the dotted lines in Fig. 4 whereby the portion 10 of the trigger is disengaged from the notch 11 and the brake shoe is permitted to drop and move into an operative position between the bottom of the wheel and the ground.

The tripping means for the trigger of each brake consists preferably of a cross-bar 12 which extends transversely from side to side of the automobile with its ends arranged to abut against the tripping portions 10ª of the triggers for the brakes at the opposite sides of the automobile. This cross-bar is fixed at each end to a rod 13 which extends longitudinally of the chassis of the automobile and forwardly to a point in front thereof, a fender or cross-bar 14 connecting the forward ends of these rods. These rods may be guided to slide longitudinally by any suitable means, a tube 15 being provided for each rod in the present instance and in which each rod is slidable longitudinally. The fender or cross-bar 14 is held in its normal forward or inoperative position by a compression spring 16 which is interposed between the fender or cross-bar 14 and the forward end of the respective tube 15. When the fender 14 and the rods 13 attached thereto are in their normal forward inoperative position, the transverse tripping member 12 occupies a position in front of the tripping portions 10ª of the triggers and the triggers will engage the notches in the supporting bars of the respective brake shoes, thereby holding the brake shoes in elevated and inoperative position. When the fender or cross-bar 14 at the front of the automobile encounters an object, such as the body of a person, the rearward pressure exerted thereon will push the fender or bar 14 rearwardly, causing rearward motion of the rods 13 as well as the cross-bar 12, the rearward movement of the cross-bar 12 causes the tripping of the triggers and consequent dropping of the brake shoes into positions between the wheels and the ground or the surface of the road, thereby arresting the movement of the automobile automatically or without requiring the attention of the operator and avoiding passage of the automobile over the object.

In order to release the brake, the automobile is backed to remove the wheels from the brake shoes and the latter are then lifted and the triggers reëngaged with the notches in the supporting bars of the brake shoes.

I claim as my invention:—

1. A brake for automobiles and the like comprising brake shoes, curved bars connected thereto and movable by gravity to positions beneath the wheels, triggers coöperative with said bars and normally supporting the brake shoes in inoperative positions, and means located at the front of the automobile and movable rearwardly to release the brake shoes and thereby cause operation thereof.

2. A brake for automobiles comprising, in combination, a pair of brake shoes having curved supporting bars, relatively fixed guides arranged in front of the wheels and coöperative with said curved bars to guide the brake shoes into positions beneath such wheels, triggers coöperative with said bars to normally hold the brake shoes in inoperative positions, and means located in front of the automobile and movable rearwardly to trip the triggers.

3. A brake for automobiles comprising, in combination, a pair of brake shoes having a normal tendency to assume operative positions beneath the wheels of the automobile, a pair of triggers normally holding the brake shoes in inoperative positions, a pair of rods at opposite sides of and movable longitudinally of the automobile and having means for tripping said triggers when moved rearwardly, a transverse fender connected to the forward ends of said rods and located in front of the automobile, and springs normally holding said rods and transverse fender in forward position.

In testimony whereof I have hereunto set my hand in presence of two subscribing witnesses.

JOHN LAMPLE.

Witnesses:
EMIL LINK,
FRANZ WILHELM.